May 6, 1958
P. A. GUINARD
2,833,601
BEARINGS
Filed June 21, 1955
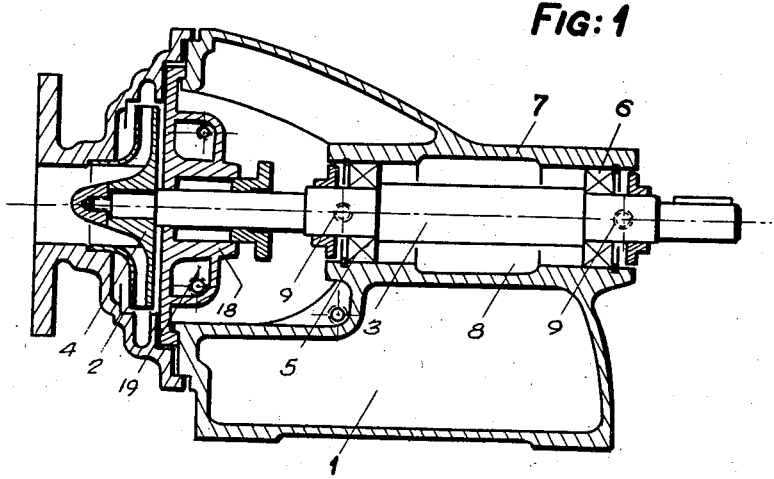
FIG: 1
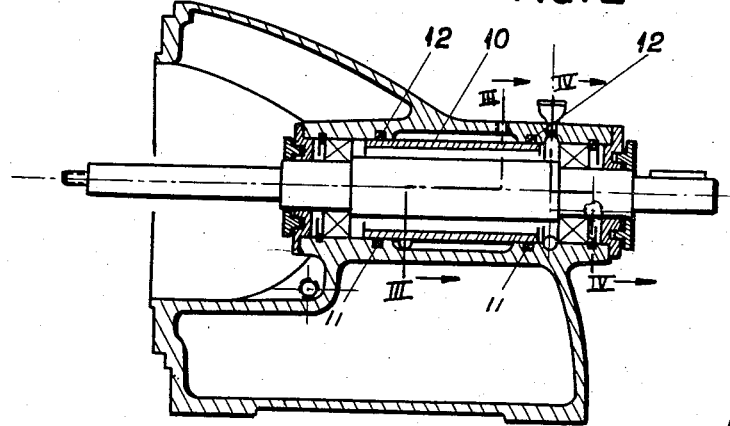
FIG: 2
FIG: 3
FIG: 4
FIG: 5
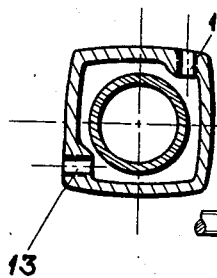
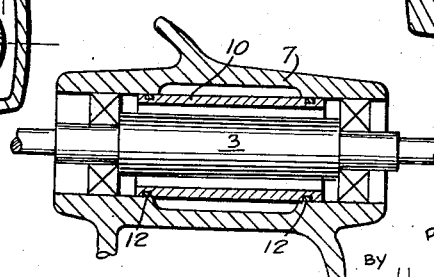
INVENTOR
PAUL ANDRÉ GUINARD
BY Henry R. Feit
ATTORNEY

United States Patent Office 2,833,601
Patented May 6, 1958

2,833,601

BEARINGS

Paul André Guinard, Saint Cloud, France

Application June 21, 1955, Serial No. 516,910

Claims priority, application France June 25, 1954

3 Claims. (Cl. 308—77)

The present invention relates to an improvement for bearings, particularly for pump bearings and aims at allowing to cool these bearings at will, with the aid of simple means.

It has already been proposed to cool the bearings by circulating a refrigerating fluid such as water or oil (serving in same time for the lubrication), through annular chambers provided, either between the shaft and the bearing, or in the body of the bearing. The known devices offer the drawback that they require the manufacturing of bearings designed specially for this purpose, usually of a complicated form.

The present invention allows this result to be obtained with the aid of simple means and at little cost. The bearing body according to the invention comprises a housing provided with a central cavity and, either side of said cavity, with two axially aligned cylindrical supporting surfaces for two anti-friction bearings carrying the shaft, said supporting surfaces having a smaller diameter than the central cavity and a relatively great length so as to have inwardly extending free end parts, a tube being tightly and removably inserted into said free ends of said supporting surfaces between the anti-friction bearing to separate the central cavity into two annular concentric chambers comprised between the housing and the tube and between the tube and the shaft respecively, the inner chamber serving as oil-tank and the outer chamber including an inlet and an outlet for the cooling water.

According to a preferred form of embodiment of the invention, a groove is provided close to the inner free edge of each of the supporting surfaces of the bearings to house an annular seal made of a material elastically deformable such as rubber, the removable tube separating the two concentric chambers being inserted in these two annular seals. The annular seals can also be housed in grooves formed at the ends of this tube and be inserted in the inner ends of the supporting surfaces of the bearing, thus allowing the usual bearings to be utilized without having to machine them purposely.

Other advantages and particulars will appear in the following description made with reference to the annexed drawing given only by way of example and in which:

Figure 1 is a general view, in axial section, of a pillow-block.

Figure 2 is a similar view of the same pillow-block, modified to allow its cooling.

Figure 3 and Figure 4 are partial sections along lines III—III and IV—IV, respectively, in Figure 2.

Fig. 5 shows an alternative arrangement of the annular seals.

The bearing illustrated in Figure 1 forms a pillow-block 1, suitable to receive indifferently several types of centrifugal pumps, one of these pumps being illustrated in 2. The shaft 3 which, in this embodiment, supports the wheel 4 of the centrifugal pump 2 is mounted by means of ball bearings 5, 6, in the tubular body 7 of the pillow-block 1 which, according to the invention and, as it will be indicated below, includes a cavity 8 to allow, after fitting up, the cooling of the bearing.

In the example of Figure 1, the arrangement provides lubrication with grease, with the aid of greasers mounted at 9. A lubrication with oil can also be provided in this embodiment, as it will be described with reference to Figure 2.

According to an important characteristic of the present invention, the transformation of this bearing into a cooled bearing can be carried out very easily by inserting in the tubular body 7 of the pillow-block 1 a cylindrical tube 10 with interposition, near the ends of this tube 10, of annular seals 11 engaged in corresponding annular grooves 12 in the body 7. The tubular wall 7 forms thereby with the outer wall of the tube 10 a circulation chamber for a cooling liquid having an inlet in 13 and an outlet in 14, as shown in Figure 3.

In this embodiment, it is more advisable to make use of a lubrication by oil: the filling takes place in 15 (Figure 4) and the checking of the level in 16. The plug 16 of the level-tell-tale is made of a transparent material and preferably includes an inner blind pipe 17 which fills with oil when the level is reached. The oil in the blind pipe can then be seen directly from outside thus supplying a permanent visual checking device.

The lubrication with oil, as shown in Figure 2, can be applied in the case of Figure 1.

The stuffing-box 18, or casing of the rotating packing ring of the pump 2, as shown in Figure 1, may include a cooling chamber 19. The pillow-block forming a bearing 1 as above described, can be stocked in the rough-cast state and later on be machined, either partly according to Figure 1 or totally according to Figure 2. It can also be stocked after completion of the machining, thus allowing the mounting, upon request, either according to Figure 1 or to Figure 2, the shafts, ball rollers, caps and plugs being stocked in the completely machined state.

The embodiments previously described and illustrated are, of course, only given here by way of example. More generally, all modifications which do not change in any way the principal features above exposed remain in the scope of the present invention.

What I claim is:

1. A pillow-block, particularly for centrifugal pumps having a horizontal shaft, of the type comprising a body provided with two concentric annular chambers to circulate a lubricating and a cooling liquid respectively, said body being provided with a central cavity and, either side of said cavity, with two axially aligned cylindrical borings having a diameter smaller than that of said central cavity, two antifriction bearings carrying the shaft and fitted near the outer extremities of said borings which have a relatively great length so as to extend inwardly of said bearings towards the central cavity, a cylindrical tube tightly and removably inserted into said inwardly extending borings between the antifriction bearings to separate the central cavity into said two concentric annular chambers comprised between the wall of said cavity and the tube, and between the tube and the shaft respectively, means to supply the inner annular chamber with a lubricating substance, inlet and outlet openings provided in the outer annular chamber to circulate cooling water therethrough, and closing members, inserted in the outer ends of the borings provided in the body and having each a central bore for the shaft.

2. A pillow-block, particularly for centrifugal pumps having a horizontal shaft, of the type comprising a body provided with two concentric annular chambers to circulate a lubricating and a cooling liquid respectively, said body consisting of a tubular housing provided with a central cavity and, either side of said cavity, with two axially aligned cylindrical borings having a diameter smaller than that of said central cavity, two ball bearings carrying the shaft and fitted near the outer extremities of said borings which have a relatively great length so as to extend inwardly of said bearings towards the central cavity, a circular groove provided in said inwardly extending part of each boring, an annular seal made of elastically deformable material arranged in each of said grooves, a cylindrical tube removably inserted by its ends into said annular seals, whereby the said central cavity is separated into said two concentric annular chambers comprised between the tubular housing and the tube, and between the tube and the shaft respectively, means to supply the inner annular chamber with a lubricating substance, inlet and outlet openings provided in the outer annular chamber to circulate cooling water therethrough, and closing members inserted in the outer ends of the borings provided in the tubular housing and having each a central bore for the shaft.

3. A pillow-block, particularly for centrifugal pumps having a horizontal shaft, of the type comprising a body provided with two concentric annular chambers to circulate a lubricating and a cooling liquid respectively, said body consisting of a tubular housing provided with a central cavity and either side of said cavity, with two axially aligned cylindrical borings having a diameter smaller than that of said central cavity, two ball bearings carrying the shaft and fitted in the outer extremities of said borings which have a relatively great length so as to extend inwardly of said bearings towards the central cavity, a cylindrical tube provided near its ends with circular grooves and with annular elastically deformable seals located in said grooves and inserted into said inwardly extending borings between the ball bearings, whereby the said central cavity is separated into said two concentric annular chambers comprised between the tubular housing and the tube, and between the tube and the shaft respectively, means to supply the inner annular chamber with a lubricating substance, inlet and outlet openings provided in the outer annular chamber to circulate cooling water therethrough, and closing members inserted in the outer ends of the borings provided in the tubular housing and having each a central bore for the shaft.

References Cited in the file of this patent

UNITED STATES PATENTS

| | | |
|---|---|---|
| 2,257,011 | Hillier | Sept. 23, 1941 |
| 2,368,962 | Blom | Feb. 6, 1945 |